A. KIPNISS.
DEVICE FOR ADJUSTING THE JAWS OF REVOLVING LATHE CHUCKS.
APPLICATION FILED FEB. 2, 1915.
1,203,628.
Patented Nov. 7, 1916.
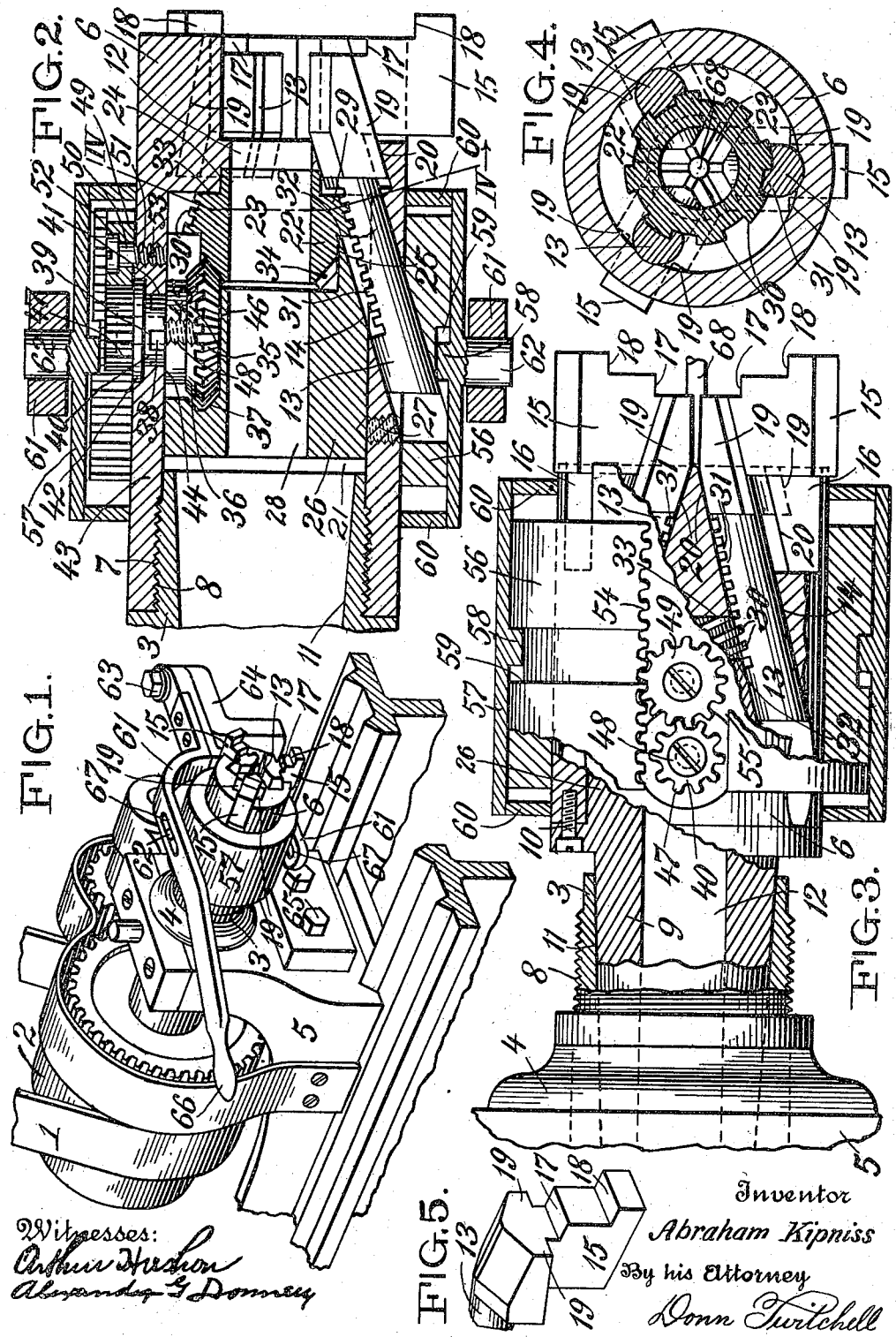
Witnesses:
Arthur Hudson
Alexander G Dorsey
Inventor
Abraham Kipniss
By his Attorney
Donn Turtchell

UNITED STATES PATENT OFFICE.

ABRAHAM KIPNISS, OF BROOKLYN, NEW YORK.

DEVICE FOR ADJUSTING THE JAWS OF REVOLVING LATHE-CHUCKS.

1,203,628.  Specification of Letters Patent.  Patented Nov. 7, 1916.

Application filed February 2, 1915. Serial No. 5,708.

*To all whom it may concern:*

Be it known that I, ABRAHAM KIPNISS, a citizen of the United States, and a resident of the city of New York, in the county of Kings and State of New York, have invented a certain new and useful Device for Adjusting the Jaws of Revolving Lathe-Chucks, of which the following is a specification.

This invention relates to lathe chucks having jaws which are readily adjustable in order that different articles to be worked upon may be attached.

The object of the invention is to provide means whereby articles of great difference in size may be attached to or released from the chuck without the necessity of stopping the rotation thereof.

The invention consists in the use on jaws moving in inclined guides, of a series of shoulders placed at different distances radially from the center of the chuck, and in manually operative mechanism for actuating said jaws during rotation of the chuck.

The invention also consists in providing means whereby articles can be passed through the center of said chuck, and in providing means whereby said chuck can be readily attached to or removed from the lathe spindle.

In the accompanying drawing: Figure 1 is a perspective view showing the chuck attached to a lathe spindle, and showing a manually operative lever pivoted to the lathe and arranged to operate the mechanism for actuating the jaws during rotation of the chuck. Fig. 2 is a sectional elevation showing the jaw actuating mechanism moved to a position which causes the jaws to be opened to their greatest extent. Fig. 3 is a plan view partly in section of a modification of Fig. 2, showing the jaw actuating mechanism moved to a position causing the jaws to clutch an article of the smallest diameter they are adapted for. Fig. 4 is a transverse section on the line IV—IV of Fig. 2; looking in the direction indicated by the arrow. Fig. 5 is a perspective view of a portion of one of the jaws.

As shown in the drawing, a driving belt 1 riding over a pulley 2 causes rotation of the spindle 3 in a bearing 4 of the head stock 5 of a lathe. The chuck 6 may be attached to the lathe spindle 3 by engagement of the screw threaded portion 7 of the chuck with the screw threads 8 of the lathe spindle; in the manner shown in Fig. 2; or as shown in Fig. 3 by means of a tapering shank 9 which is secured to the chuck by means of screws 10, the tapering shank being forced into frictional engagement with the correspondingly shaped interior surface 11 of the hollow spindle 3 of the lathe. The tapering shank 9 and the chuck body 6 are provided with a central bore 12 through which an article to be worked upon may be passed in the usual manner.

Three jaws 13 placed at equal distances apart around the central bore 12 are fitted in inclined guides 14 formed in the forward end of the chuck body 6. The forward end of each jaw 13 has a lateral extension 15 moving in radially extending guides 16 formed in the chuck body. Said lateral extension 15 of each of said inclined jaws is provided with a shoulder 17 and a shoulder 18 located a greater distance radially from the center of the chuck than shoulder 17 whereby articles of great difference in size may be clutched. Each one of said lateral extensions 15 is provided with two lateral flanges 19 which are adapted to move in inclined guides 20 formed in the chuck, parallel to said inclined guides 14 in which said inclined jaws 13 move. The other end of the chuck body is provided with a large cavity 21, at one end of which is placed a sleeve 22 having a central bore 23 equal in diameter to the central bore 12 of the chuck body. The sleeve 22 is free to rotate in a bearing 24 formed in the chuck body, and in a bearing 25 formed in a plug 26, which plug is placed in cavity 21 and secured by means of set screws 27. The plug 26 is provided with the central bore 28, and can have the limited length shown in Fig. 2, or it may be a forward extension of the tapering shank 9, shown in Fig. 3.

The sleeve 22 is provided with a flange 29 the peripheral surface of which tapers toward the forward end of the chuck and is provided with a series of square screw threads 30, adapted to fit corresponding screw threads 31 formed on the jaws 13. The flange 29 bears against an end wall 32 of plug 26 and against the wall 33 at one end of the cavity 21. Sleeve 22 is provided with a series of bevel gear teeth 34 which are in mesh with bevel gear teeth 35 formed on a wheel 36. The plug 26 is cut away at 37 to provide space for the wheel 36. The hub of wheel 36 is provided with clutch teeth 38 fitting corresponding grooves 39 formed in a short shaft 40 which rotates in a bearing 41 formed in the chuck body. The shaft 40 is provided with a flange 42 which bears against the outer side of wall 43 of the chuck body; and one side 44 of wheel 36 bears against the inner side of the wall 43. The other side 45 of wheel 36 bears against a flat surface 46 formed on the plug 26. The bearing surfaces 42, 44 and 46 are serviceable as they compensate for the very short length of bearing 41. A portion of the shaft 40 projecting beyond the exterior of the chuck body is provided with a series of gear teeth 47. The shaft 40 is secured to wheel 36 by means of a screw 48.

In mesh with gear teeth 47 is a gear wheel 49 which is free to rotate on the body portion 50 of a screw 51 having a flange 52 which serves to hold the gear wheel in place. The screw 51 is secured to the chuck body by means of a pin 53. In mesh with gear wheel 49 is a rack 54 located on one side of slot 55 formed in a sleeve 56, which sleeve is adapted for reciprocating movement on the exterior of the chuck body. An outer sleeve 57 adapted for reciprocating movement on the exterior of sleeve 56 is provided with an internal rib 58 which projects into an annular groove 59 formed on the inner sleeve 56. The groove 59 is wider than the rib 58 so that after a limited longitudinal movement of the outer sleeve, the rib 58 thereon will take against the inner sleeve 56, thereby causing the inner sleeve to be moved longitudinally during further longitudinal movement of the outer sleeve. It will be seen that during the limited movement of the outer sleeve previous to contact of rib 58 with the inner sleeve, the outer sleeve will acquire considerable momentum which will be imparted to the inner sleeve.

The outer sleeve is longer than the inner sleeve, and the space between the overhanging ends of the outer sleeve and the chuck body is closed by means of rings 60, which may be secured to the outer sleeve in any suitable manner. The outer sleeve and the rings 60 serve to screen the inner sleeve and gearing from view.

The outer sleeve can be manually reciprocated direct as shown in Fig. 3, or by means of a lever 61 engaging lugs 62 which project radially from the outer sleeve, as shown in Figs. 1 and 2. The lever 61 is pivoted at 63 to a bracket 64, which bracket is secured to the head stock 5 of the lathe by means of bolts 65. The lever 61 is provided with a handle 66 by which the operator can move it, thereby causing longitudinal movement of the outer sleeve 57. Slots 67 are formed in the lever 61 in order that necessary play of lugs 62 will be permitted.

During movement of the outer and inner sleeves from the position shown in Fig. 2, to the position shown in Fig. 3, the rack 54 causes rotation of gear wheel 49 which in turn causes rotation of shaft 40 and bevel gear wheel 36. Rotation of bevel gear wheel 36 causes rotation of the sleeve 22 and the tapering screw-threaded flange 29, which causes the correspondingly screw threaded inclined jaws 13 to be moved from the position shown in Fig. 2 to the position shown in Fig. 3, whereby said jaws are moved toward each other and serve to clutch an article 68. It will be evident that movement of said outer and inner sleeves from the position shown in Fig. 3 to the position shown in Fig. 2 will cause movement of the jaws away from each other, thereby releasing said article.

No claim will be made in this application for a longitudinally reciprocating sleeve for causing rotation of the screw which actuates the inclined jaws, as such was claimed in my former application filed August 5, 1914, Serial Number 855,179, for "Device for adjusting the jaws of revolving chucks."

Having described my invention, what I claim is:

1. A device of the character described comprising a rotating chuck having a series of inclined movable jaws, said chuck having inclined guides in which said jaws are free to move; one end of each of said jaws having radial extensions, and said chuck having radially extending guides in which said radial extensions are free to move; each of said radial extensions being provided with shoulders placed at different distances radially from the center of the chuck, whereby articles of great difference in size may be clutched; and manually operative means for actuating said jaws, whereby they can be moved in a direction adapted to clutch an article, and whereby they can be moved in a direction adapted to release said article.

2. A device of the character described comprising a rotating chuck having a series of inclined movable jaws, one end of each of said jaws having shoulders placed at different distances radially from the center of the chuck, whereby articles of great difference in size may be clutched, each of said jaws having lateral flanges adapted to move in inclined guides formed in said chuck, said chuck also having radially extending guides in which said jaws are free to move; mechanism for actuating said jaws; a manually operative longitudinally reciprocating sleeve forming part of said jaw actuating mechanism; means whereby longitudinal movement of said sleeve in one direction causes movement of said jaws in a direction adapted to clutch an article; and means whereby longitudinal movement of said sleeve in the reverse direction causes movement of said jaws in a direction adapted to release said article.

3. A device of the character described comprising a rotating chuck having a series of inclined movable jaws, one end of each of said jaws having shoulders placed at different distances radially from the center of the chuck, whereby articles of great difference in size may be clutched, each of said jaws having lateral flanges adapted to move in inclined guides formed in said chuck, said chuck also having radially extending guides in which said jaws are free to move; mechanism for actuating said jaws; a manually operative longitudinally reciprocating sleeve forming part of said jaw actuating mechanism; and means whereby longitudinal movement of said sleeve in one direction causes movement of said jaws in a direction adapted to clutch an article.

4. A device of the character described comprising a rotating chuck having a series of inclined movable jaws, one end of each of said jaws having shoulders placed at different distances radially from the center of the chuck, whereby articles of great difference in size may be clutched, each of said jaws having lateral flanges adapted to move in inclined guides formed in said chuck, said chuck also having radially extending guides in which said jaws are free to move; said inclined jaws being provided with screw threads; a rotatable part having screw threads engaging said screw threads on said inclined movable jaws; and manually operative means for actuating said rotatable screw threaded part whereby it may be rotated in a direction adapted for causing movement of said jaws in a direction to clutch an article, and whereby said rotatable screw threaded part may be rotated in a direction adapted for causing movement of said jaws in a direction to release said article.

5. A device of the character described comprising a rotating chuck having a series of inclined jaws, said chuck having correspondingly inclined guides in which said jaws are free to move longitudinally, one end of each one of said jaws having a lateral extension moving in guides formed in the chuck and extending radially from the center thereof, said lateral extension of said inclined jaws having shoulders placed at different distances radially from the center of the chuck, whereby articles of great difference in size may be clutched, and said lateral extension also having lateral flanges adapted to move in inclined guides formed in the chuck and extending parallel to said inclined guides in which said inclined jaws move; and said inclined jaws being provided with screw threads; a rotatable part having screw threads engaging said screw threads on said inclined movable jaws; and manually operative means for actuating said rotatable screw threaded part whereby it may be rotated in a direction adapted for causing movement of said jaws in a direction to clutch an article, and whereby said rotatable screw threaded part may be rotated in a direction adapted for causing movement of said jaws in a direction to release said article.

6. A device of the character described, comprising a lathe having a rotating spindle provided with a chuck having a series of inclined movable jaws; mechanism for actuating said jaws; a rotatable screw forming part of said jaw-actuating mechanism; said lathe spindle, said chuck, and said screw being provided with a central longitudinal bore, whereby an article can be passed longitudinally through the center of the chuck; said chuck having a manually operative longitudinally reciprocating sleeve; means whereby longitudinal movement of said sleeve in one direction causes rotation of said screw in a direction adapted for causing movement of said jaws in a direction to clutch an article, and whereby longitudinal movement of said sleeve in the reverse direction causes rotation of said screw in a direction adapted for causing movement of said jaws in a direction to release said article.

7. In a lathe having a rotatable spindle, a chuck having a series of inclined movable jaws, said jaws having screw threads on the sides thereof facing toward the center of the chuck; a rotatable screw in the center of said chuck, the threads of said screw engaging said screw threads of said inclined movable jaws, and said screw being provided with a bevel gear pinion; said lathe spindle, said chuck, and said screw being provided with a central longitudinal bore, whereby an article can be passed longitudinally through the center of the chuck; a manually operative longitudinally reciprocating sleeve provided with a rack; gear mechanism interposed between said bevel gear pinion and the rack on said sleeve, said gear mechanism having a bevel gear wheel in mesh with said bevel gear pinion; said bevel gear wheel having a short shaft which rotates in a bearing formed on said chuck; and said chuck being provided with bearings which extend transversely of said bevel gear wheel; means whereby longitudinal movement of said sleeve in one direction causes said gear mechanism to rotate said screw in a direction to cause said jaws to clutch an article, and whereby longitudinal movement of said sleeve in the reverse direction causes said gear mechanism to rotate said screw in a direction to cause said jaws to release said article.

8. In a lathe the combination with a revolving chuck having movable jaws and mechanism for actuating said jaws; of a rotatable screw forming part of said jaw-actuating mechanism; said chuck and said screw being provided with a central longitudinal bore, whereby an article can be passed longitudinally through the center of the chuck; and a longitudinally reciprocating sleeve forming part of said jaw actuating mechanism, said sleeve having an annular groove; a non-rotatable sleeve on the exterior of the first-named sleeve; said exterior sleeve being provided with an annular rib engaging said groove of the first-named sleeve, the width of said rib being less than that of said groove, whereby lost motion occurs between said exterior sleeve and the first-named sleeve when said exterior sleeve is moved longitudinally in one direction, and whereby further longitudinal movement of both sleeves in the same direction causes rotation of said screw in a direction adapted for causing movement of said jaws in a direction to clutch an article, and whereby longitudinal movement of both of said sleeves in the reverse direction causes rotation of said screw in a direction adapted for causing movement of said jaws in a direction to release said article.

9. A device of the character described, comprising a rotating chuck having movable jaws, mechanism for actuating said jaws, a longitudinally reciprocating sleeve forming part of said mechanism, said sleeve having an annular groove, a manually operative sleeve having longitudinally reciprocating movements on the exterior of the first named sleeve, said manually operative sleeve having an annular rib engaging said groove, the width of said rib being less than that of said groove, whereby lost motion occurs between said manually operative sleeve and the first named sleeve, when said manually operative sleeve is moved in one direction, and whereby further longitudinal movement of both sleeves in the same direction causes movement of said jaws adapted to clutch an article; and means whereby longitudinal movement of both of said sleeves in the reverse direction causes movement of said jaws adapted to release said article.

10. In a lathe having a rotatable spindle, a chuck adapted to be removably attached to said spindle, whereby the chuck may be rotated; said chuck having a series of inclined movable jaws, said jaws having screw threads on sides thereof facing toward the center of the chuck; a rotatable screw in the center of said chuck, the threads of said screw engaging said screw threads on the inner sides of said inclined movable jaws, and said screw being provided with a bevel gear pinion; said lathe spindle, said removable chuck, and said screw having said bevel gear pinion, being provided with a central longitudinal bore, whereby an article can be passed longitudinally through the center of the chuck; a manually operative longitudinally reciprocating sleeve provided with a rack; gear mechanism interposed between said bevel gear pinion and the rack on said sleeve; said sleeve having an annular groove, a manually operative non-rotatable part fitting said groove whereby said sleeve can be moved longitudinally; means whereby longitudinal movement of said sleeve in one direction causes said gear mechanism to rotate said screw in a direction to cause said jaws to clutch an article, and whereby longitudinal movement of said sleeve in the reverse direction causes said gear mechanism to rotate said screw in a direction to cause said jaws to release said article.

11. Mechanism of the character described, comprising a rotating chuck having a series of inclined movable jaws, said jaws having screw threads on sides thereof facing toward the center of the chuck; a rotatable screw in the center of said chuck, the threads of said screw engaging said screw threads on the inner sides of said inclined movable jaws, and said screw being provided with a bevel gear pinion; said chuck and said screw having said bevel gear pinion being provided with a central longitudinal bore, whereby an article can be passed longitudinally through the center of the chuck; a manually operative longitudinally reciprocating sleeve provided with a rack; gear mechanism interposed between said bevel gear pinion and the rack on said sleeve; said sleeve having an annular groove; a manually operative non-rotatable part fitting said groove, whereby said sleeve can be moved longitudinally; means whereby longitudinal movement of said sleeve in one direction causes said gear mechanism to rotate said screw in a direction to cause said jaws to clutch an article, and whereby longitudinal movement of said sleeve in the reverse direction causes said gear mechanism to rotate said screw in a direction to cause said jaws to release said article.

12. Mechanism of the character described, comprising a rotating chuck having a series of inclined movable jaws, said jaws having screw threads on sides thereof facing toward the center of the chuck; a rotatable screw in the center of said chuck, the threads of said screw engaging said screw threads on the inner sides of said inclined movable jaws, and said screw being provided with a bevel gear pinion; said chuck and said screw having said bevel gear pinion being provided with a central, longitudinal bore, whereby an article can be passed longitudinally through the center of the chuck; a manually operative longitudinally reciprocating sleeve provided with a rack; gear mechanism interposed between said rack and said bevel gear pinion; means whereby longitudinal movement of said sleeve in one direction causes said gear mechanism to rotate said screw in a direction to cause said jaws to clutch an article; and whereby longitudinal movement of said sleeve in the reverse direction causes said gear mechanism to rotate said screw in a direction to cause said jaws to release said article.

13. A device of the character described, comprising a rotating chuck having a series of inclined movable jaws, said jaws having screw threads on sides thereof facing toward the center of the chuck; a rotatable screw in the center of said chuck, the threads of said screw engaging said screw threads on the inner sides of said movable jaws; said chuck and said screw having a central longitudinal bore, whereby an article can be passed longitudinally through the center of the chuck; a manually operative longitudinally reciprocating sleeve; mechanism interposed between said screw and sleeve, whereby longitudinal reciprocating movement of said sleeve causes rotation of said screw; means whereby longitudinal movement of said sleeve in one direction causes rotation of said screw in a direction adapted for causing movement of said jaws in a direction to clutch an article; and whereby longitudinal movement of said sleeve in the reverse direction causes rotation of said screw in a direction adapted for causing movement of said jaws in a direction to release said article.

Signed at New York city in the county of New York and State of New York this 29th day of January A. D. 1915.

ABRAHAM KIPNISS.

Witnesses:
   BESSIE M. SMITH,
   G. McDONOUGH.

Copies of this patent may be obtained for five cents each, by addressing the "Commissioner of Patents, Washington, D. C."